UNITED STATES PATENT OFFICE.

KARL PAUL GRÄLERT, MAX BUFF, AND JOSEPH FLASHSLAENDER, OF ELBERFELD, GERMANY, ASSIGNORS TO SYNTHETIC PATENTS CO., INC., OF NEW YORK, N. Y., A CORPORATION OF NEW YORK.

SULFUR DYES.

1,112,445.  Specification of Letters Patent.  Patented Oct. 6, 1914.

No Drawing.  Application filed December 6, 1913. Serial No. 805,057.

*To all whom it may concern:*

Be it known that we, KARL PAUL GRÄLERT, MAX BUFF, and JOSEPH FLASHSLAENDER, doctors of philosophy, chemists, citizens of the German Empire, residing at Elberfeld, Germany, have invented new and useful Improvements in New Sulfur Dyes, of which the following is a specification.

The present invention is a continued application of our application Serial No. 777844 filed July 8, 1913, and relates to the manufacture and production of new and valuable brown sulfur colors which are obtained by treating with alkali polysulfids and copper or copper compounds phthaloperinone compounds having most probably the formula:

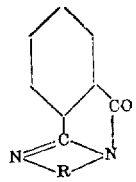

in which R stands for a naphthalene ring.

The new dyes are after being dried and pulverized dark powders soluble in a solution of sodium sulfid generally with a yellowish-brown to red-brown coloration and soluble in concentrated sulfuric acid with a brown coloration. They dye cotton in bloomy brown shades distinguished by their fastness to light.

In order to illustrate the new process more fully the following example is given, the parts being by weight: 130 parts of crystallized sodium sulfid, 40 parts of sulfur, 10 parts of copper sulfate, 20 parts of phthaloperinone having most probably the following formula:

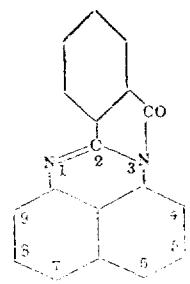

are heated during 8 to 10 hours to 200 to 220° C. The melt is powdered and is then ready for use. The dyestuff is a dark powder soluble in a sodium sulfid solution with a reddish-brown coloration. It is soluble in concentrated sulfuric acid with a brown coloration and dyes cotton in pure reddish-brown shades fast to light.

The above mentioned quantities of sodium sulfid and of sulfur as well as the temperature and the duration of the reaction can be varied within wide limits.

Similar dyestuffs are obtained by using other of the above mentioned products, such as perimidylbenzoic acid, halogenphthaloperinones e. g. dibromophthaloperinone etc.

We claim:

1. The new sulfur dyes obtained from phthaloperinone compounds having most probably the formula:

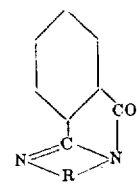

in which R stands for a naphthalene ring which dyes are after being dried and pulverized dark powders being soluble in a solution of sodium sulfid generally with a yellowish-brown to red-brown coloration; being soluble in concentrated sulfuric acid with a brown coloration; and dyeing unmordanted cotton bloomy brown shades fast to light, substantially as described.

2. The new sulfur dye obtained from phthaloperinone having most probably the formula:

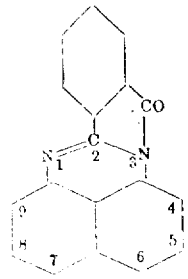

which is after being dried and pulverized a dark powder soluble in a sodium sulfid solution with a reddish-brown coloration and soluble in concentrated sulfuric acid with a brown coloration; dyeing unmordanted cotton in pure reddish-brown shades fast to light, substantially as described.

In testimony whereof we have hereunto set our hands in the presence of two subscribing witnesses.

KARL PAUL GRÄLERT. [L. S.]
MAX BUFF. [L. S.]
JOSEPH FLASHSLAENDER. [L. S.]

Witnesses:
ALBERT NUFER,
FRANCES NUFER.

It is hereby certified that in Letters Patent No. 1,112,445, granted October 6, 1914, upon the application of Karl Paul Grälert, Max Buff, and Joseph Flachslaender, of Elberfeld, Germany, for an improvement in "Sulfur Dyes," the name of the third-mentioned patentee was erroneously written and printed as "Joseph Flashslaender," whereas said name should have been written and printed as *Joseph Flachslaender;* and that the said Letters Patent should be read with this correction therein that the same may conform to the record of the case in the Patent Office.

Signed and sealed this 26th day of January, A. D., 1915.

[SEAL.]

R. F. WHITEHEAD,
*Acting Commissioner of Patents.*